(12) United States Patent
Snyder (10) Patent No.: US 11,008,939 B2
(45) Date of Patent: May 18, 2021

(54) ADAPTABLE INERTIAL PARTICLE SEPARATOR

(71) Applicant: Rolls-Royce North American Technologies, Inc., Indianapolis, IN (US)

(72) Inventor: Philip H. Snyder, Avon, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 163 days.

(21) Appl. No.: 16/261,048

(22) Filed: Jan. 29, 2019

(65) Prior Publication Data

US 2019/0153944 A1 May 23, 2019

Related U.S. Application Data

(63) Continuation of application No. 15/065,763, filed on Mar. 9, 2016, now Pat. No. 10,227,925.

(60) Provisional application No. 62/131,510, filed on Mar. 11, 2015.

(51) Int. Cl.
  *F02C 7/05* (2006.01)
  *F02C 7/052* (2006.01)
  *F02C 7/057* (2006.01)
  *B64D 33/02* (2006.01)

(52) U.S. Cl.
  CPC ............ *F02C 7/052* (2013.01); *F02C 7/05* (2013.01); *F02C 7/057* (2013.01); *B64D 2033/0246* (2013.01)

(58) Field of Classification Search
  CPC . F02C 7/05; F02C 7/052; F02C 7/057; B64D 2033/0246
  See application file for complete search history.

(56) References Cited

U.S. PATENT DOCUMENTS

| | | |
|---|---|---|
| 3,338,049 A | 8/1967 | Marshall |
| 3,733,814 A | 5/1973 | Hull, Jr. et al. |
| 3,998,048 A | 12/1976 | Derue |
| 4,397,431 A | 8/1983 | Ben-Porat |
| 4,972,672 A | 11/1990 | Sanderson et al. |
| 8,439,295 B2 | 5/2013 | Belyew |
| 8,439,297 B2 | 5/2013 | Colaprisco et al. |
| 8,512,450 B2 | 8/2013 | Kazlauskas et al. |
| 2003/0196548 A1 | 10/2003 | Hartman |
| 2007/0095033 A1 | 5/2007 | Snyder |
| 2009/0139398 A1 | 6/2009 | Sheoran et al. |

(Continued)

FOREIGN PATENT DOCUMENTS

EP  2466097 A1  6/2012

OTHER PUBLICATIONS

Extended European Search Report dated Jul. 6, 2016 issued for European Patent Application No. 16159224.1.

*Primary Examiner* — Steven M Sutherland
(74) *Attorney, Agent, or Firm* — Fishman Stewart PLLC (57) ABSTRACT

An adaptive inertial particle separation system may include an active configuration and a passive configuration. The system may comprise an air-intake duct including an outer wall spaced apart from a central axis, an inner wall located between the outer wall and the engine rotation axis, an intake passage defined in part by the inner wall and the outer wall, and a splitter located between the outer wall and the inner wall. The system may further include a sensor operatively connected to the air-intake duct and operative to initiate at least one of the active configuration and passive configuration.

17 Claims, 4 Drawing Sheets

(56) References Cited

U.S. PATENT DOCUMENTS

2010/0162682 A1 7/2010 Lerg
2010/0236200 A1 9/2010 Saeed et al.
2014/0190347 A1 7/2014 Wong et al.
2015/0198090 A1 7/2015 Howe et al.

ADAPTABLE INERTIAL PARTICLE SEPARATOR

CROSS-REFERENCE TO RELATED APPLICATIONS

This application is a continuation of and claims priority to U.S. patent application Ser. No. 15/065,763 filed Mar. 9, 2016, which is based on and claims priority to U.S. Provisional Application No. 62/131,510 filed Mar. 11, 2015, each of which is hereby incorporated by reference in its entirety.

FIELD OF TECHNOLOGY

The present disclosure relates generally to particle separators, and more specifically to an inertial particle separator (IPS), for example, of a gas turbine engine.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Air is drawn into the engine through an air intake and communicated to the compressor via an air-intake duct. In some operating conditions, particles may be entrained in the air such as dirt, dust, sand, or liquid and may be drawn into the air intake and passed through the air-intake duct to the compressor. Such particles may impact components of the compressor and turbine causing unintended wear. In addition, the deposit and accumulation of particles may cause fowling and plugging of engine passages. This unintended wear may decrease power output of the engine, shorten the life span of the engine, and lead to increased maintenance costs and increased down time of the engine.

To separate particles from air entering the compressor, an inertial particle separator may be utilized. The inertial particle separator uses the inertia of the particles to separate the particles from the air. As the air stream moves through the air-intake duct, the air moves along a serpentine flow path and enters a compressor passage of the air-intake duct while the particles move along a generally linear travel path and enter a scavenge passage included in the air-intake duct. In some instances, particles may deviate from the generally linear travel path and enter the compressor passage rather than the scavenge passage. Particles may deviate from the generally linear travel path due separation of flow from an outer wall of the air-intake duct leading to recirculation of the particles and/or other fluid flow phenomenon upstream of the scavenge passage.

Traditional technologies for particle separation may include a vortex tube and a barrier filter. The vortex tube requires a swirl tube structure, which unnecessarily consumes space and weight. The barrier filter uses a media to capture particulate, but requires frequent cleaning maintenance. Furthermore, inertial particle separators may utilize inflatable boots. However, these inflatable flow surfaces merely constrict or obstruct flow and do not contain translating components for enhanced particle separation. Thus, the capabilities of traditional particle separators are limited.

With traditional technologies, transient flow structures may be generated within an internal boundary layer separated flow region. This may sporadically extend the influence of the disturbed flow beyond the time averaged flow behaviors and locally interrupt the flow into the scavenge passage. This interruption may be to the extent of allowing a portion of the air that has entered the scavenge passage, that is laden with particulate, to enter the leg of the particle separator intended for compressor flow only. Traditional technologies have limited ability to minimize the formation of transient flow structures or the negative resulting influences on engine performance.

In addition, traditional technologies do not have sufficient ability to adjust or adapt the operation and performance characteristics of the particle separator to the demands placed on the turbine engine due to changing engine power demands, engine degradation level, or dramatically changing quantity or properties of particulate entering the engine inlet system. In many cases this causes the particle separator system to adversely affect the engine performance even in the absence of the presence of particulate.

To address the above, there is a need for an adaptive particle separation system. The need is to reduce the penalties to engine operation caused by the particle separator in when the operational environment causes them to be unneeded or inappropriate. It may be desirable to provide adaptive features such as sensors, active control devices, electrostatics, translating components, and variable control of scavenge passage flow level. Thus, there is a need for a system that minimizes the total penalties that the separator imposes on the gas turbine engine while also realizing an appropriate level of protection of the engine from sand and dust as it is present in the inlet airstream.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An adaptive inertial particle separation system may include adaptive or switchable features to provide an active or open configuration adapted to split airflow between a scavenge passage and a compressor passage and a passive or closed configuration adapted to pass airflow to the compressor passage while reducing or closing the scavenge passage. The system may comprise an air-intake duct including an outer wall spaced apart from a central axis, an inner wall located between the outer wall and the engine rotation axis, an intake passage defined in part by the inner wall and the outer wall, and a splitter located between the outer wall and the inner wall. The splitter may define an initial portion of a compressor passage with the inner wall and selectively define a scavenge passage with the outer wall. The system may further include a sensor operatively connected to the air-intake duct and operative to initiate at least one of the active features including that of the scavenge passage opened and a passive configuration with the compressor passage increased and the scavenge passage decreased or closed.

As part of the active configuration, the system may utilize translating flow surfaces to alter the proximity of the splitter relative to the outer and inner walls of the air-intake duct. The translation of these surfaces, e.g., while substantially maintaining the position of the splitter, causes the intake passage to increase while the scavenge passage is reduced or closed. The motion of the flow surfaces forward, e.g. opposite of the airflow direction, selectively switches on and off the particle separation function of the system.

The system also includes additional features that may be used as part of the active configuration. For example, these additional features may assist particle separation. The additional features may include any active devices such as a scavenge motive device (e.g., a blower or ejector). The features may also include an electrostatic generator configured to selectively direct a charged airstream either toward or away from charged flow surfaces. Alternatively the electrostatic generator may be configured to cluster, e.g., aggregate, particles by combining smaller particles into larger particulates thereby facilitating the flow of clustered particulates toward the scavenge passage. The features may also include flow control devices to reduce or defeat highly dynamic fluid flows that result in separator inefficiency. These features may utilize the introduction of airflow produced by compressors in the engine. This airflow can be turned on (e.g., in the active configuration) or off (e.g., in the passive configuration). The sensor, such as a particulate sensor, may also be utilized to selectively switch between the active configuration and the passive configuration and may be positioned to reduce the sensitivity required for the sensor. For example, the sensor may be positioned on or near a flow surface of the air-intake duct. The sensor may be positioned at a location having relatively higher particulate concentrations, e.g., including the bounce and inertial trajectories of the particulates.

The switchable features may be configured to achieve relatively high particle separation levels while minimizing engine performance degradations caused by pressure loss at the intake, shaft power extraction, and air bleed withdrawal from the engine gas path. The system may also accommodate for the varying particle separation needs of vertical lift aircraft, which may vary based on the operating conditions. Switchable features may alter the operation of the particle separator to reduce particle separator pressure loss and engine performance loss at cruise conditions or other conditions having a lower particulate level. Thus, these switchable features may increase engine fuel efficiency and overall power production through the use of adaptive particle separation features to reduce intake pressure loss, reduce scavenge power requirements, turn off electrostatic generating sources, and reduce or close compressor bleed flows to the separator utilized for flow control.

Figure 1:
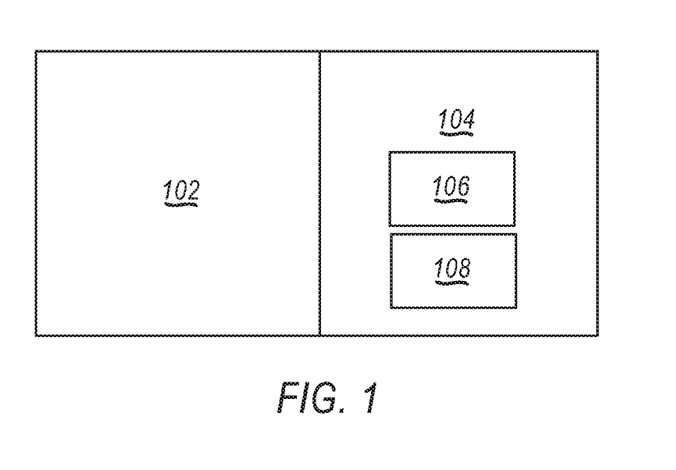
FIG. 1 illustrates a block diagram of a turbine engine system.

FIG. 1 illustrates a block diagram of a turbine engine system 100. The system 100 may include a particle separator 102 (e.g., an inertial particle separator (IPS)). The particle separator 102 may be operatively part of an aircraft airframe installed ahead of a turbine engine 104 (e.g., also referred to as an engine air particle separator (EAPS)). The particle separator 102 may be operatively coupled to a turbine engine 104 (e.g., also referred to as an integral particle separator). The turbine engine 104 may include at least one compressor 106 and at least one combustor 108. The particle separator 102 may be adapted to any turbine engine. The particle separator 102 may adapted to an aircraft such as a helicopter, airplane, unmanned vehicle, fixed wing vehicles, variable wing vehicle, or any other flying vehicle. The particle separator 102 may also be adapted for industrial applications, power generators, pumping, naval propulsion, hover crafts, and any other vehicles.

The particle separator may be configured to receive an intake flow having particulates such as dirt, dust, sand, liquid, or any particulate matter including foreign objects. The particle separator 102 splits the intake flow into a scavenge flow (e.g., to be passed away from the compressor 106) and a compressor flow (e.g., to be passed toward the compressor 106). The particle separator 102 is configured to separate at least some of particulates from the intake flow such that the particulates are conveyed away from the compressor 106 with the scavenge flow. Thus, the particulates may be removed from the intake flow with the scavenge flow and the compressor flow is passed to the compressor 106.

Figure 2A:
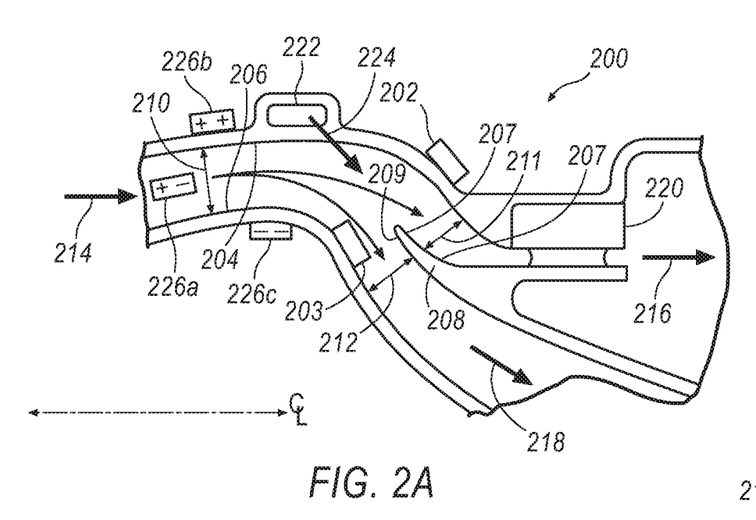
FIG. 2a illustrates a cross-sectional view of a duct system, e.g., having an active or open configuration.
Figure 2B:
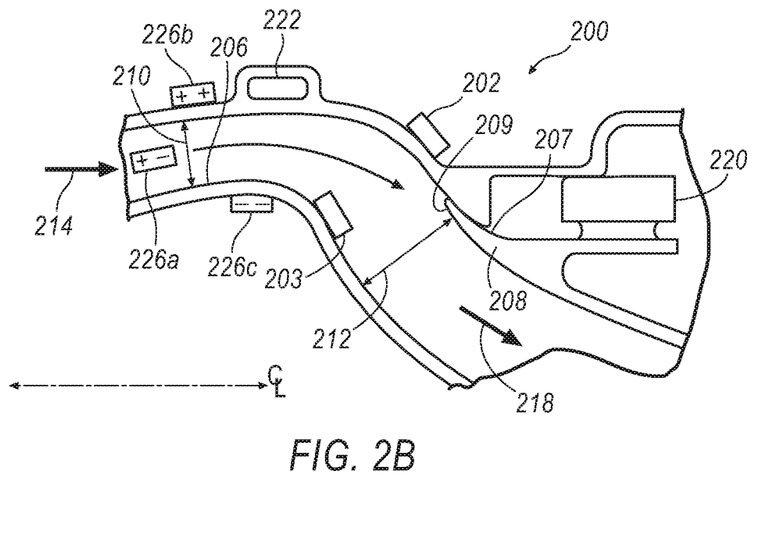
FIG. 2b illustrates a cross-sectional view of a ducts system, e.g., having a passive or closed configuration.

FIGS. 2a-b illustrate an exemplary duct system 200 of the particle separator 102. The duct system may include a sensor 202, a sensor 203, an outer wall 204, an inner wall 206, a splitter 208, an inner splitter surface 207, an outer splitter surface 209, an intake passage 210, a scavenge passage 211, a compressor passage 212, an intake flow 214, a scavenge flow 216, a compressor flow 218, an actuator 220, a flow control device 222, an injector flow 224, and electrostatic generators 226a-c. The particle separator 102 may include an active configuration as shown in FIG. 2a and a passive configuration as shown in FIG. 2b. The active configuration may include electrostatic features to energize flow control air flow while it may be flowing. Also the duct system 200 may include an active configuration as shown in FIG. 2a and a passive configuration as shown in FIG. 2b each resulting from relative translation of duct components by the actuator 220.

The outer wall 204 may be located in spaced-apart relation to a central axis (e.g., along a centerline CL of the system 100/200) and the inner wall 206 may be located between the outer wall 204 and the central axis. The inner wall 206 and the outer wall 204 are arranged to define the intake passage 210. The splitter 208 is located between the outer wall 204 and the inner wall 206. The splitter 208 is configured to define the separation of intake flow 214. Based on the position of the outer wall 204 and inner wall 206 relative to the splitter 208, the intake flow 214 may separate into the compressor flow 218 of the compressor passage 212 and the scavenge flow of the scavenge passage 211 (FIG. 2a) or may continue into the compressor flow 218 of the compressor passage 212 (FIG. 2b), e.g., bypassing the scavenge passage 211. Thus, the position of the outer wall 204 and inner wall 206 relative to the splitter 208 may determine the whether the scavenge passage 211 is utilized or bypassed. In an embodiment, the outer wall 204 and inner wall 206 may translate together. Alternatively, the outer wall 204 and inner wall 206 may translate by different amounts. In another embodiment, the outer wall 204 and inner wall 206 may remain stationary while the splitter 208 translates. Other combinations of translation are also envisioned. In each case, relative translation is in a direction may be substantially parallel to the central axis. In addition, however, relative rotation of the outer wall 204, inner wall 206, and splitter 208 about the central axis may be adapted to optimize positioning of the flow surfaces.

In use, the duct system 200 draws the intake flow 214 into the gas turbine engine 10. The intake flow includes air and particles. The particle separator 102 causes the compressor flow 218 and the scavenge flow 216 to be established as the intake flow 214 moves through the duct system 200. In some instances, a portion of the intake flow 214 may experience boundary layer separation on the outer wall 204 and establish a region of separated flow. This may occur anywhere along duct system 200, e.g., upstream of the scavenge passage 211. For example, a portion of the intake flow 214 may sporadically and intermittently separate from the outer wall 204 and enter the compressor flow 218. The particles and air trapped in the separated flow region may sometimes flow from the scavenge flow 216 and move into the compressor flow 218. This may allow particles to pass toward compressor 106. As a result, this may potentially result in damage to or degraded performance of the engine 104 including increased wear on duct system 200, turbine 104, compressor 106, and combustor 108.

The duct system 200 may include the active or open configuration (e.g., FIG. 2a) and the passive or closed configuration (e.g., FIG. 2b). The duct system 200 may utilize the active and passive configurations based on a particulate level, e.g., determined by a relative amount of particulates as part of the air. The particulate level may be measured, e.g., by sensors 202-203, according to a particulate concentration (e.g., a concentration of particulates per volume of air) and a particulate size distribution (e.g., a statistical distribution of a size of the particles as part of the air). The particulate level may be compared to a particulate threshold, which may be used to determine whether to utilize the active or passive configuration. For example, if the particulate level of the intake flow 214 reaches a particulate threshold (e.g., relatively dirty intake flow 214), the active configuration may include a number of active features to minimize particulates from being passed into the compressor flow 218, e.g., including selective activation of the scavenge flow 216, flow control device 222, electrostatics 226, and relative translation of the splitter 208, as described in further detail below. As a further example, if the particulate level of the intake flow 214 is below the particulate threshold (e.g., relatively clean intake flow 214), the passive configuration may allow the intake flow 214 to pass into the compressor flow 218. In addition, the duct system 200 may utilize selected features of or be positioned at any increment between the active and passive configurations. Thus, the ducts system 200 control flow through the particle separator 102 based on the particulate threshold, thereby utilizing the active configuration if the intake flow 214 is relatively dirty and utilizing the direct configuration if the intake flow 214 is relatively clean.

The sensors 202-203 may be utilized to measure the particulate level (e.g., of the intake flow 214) and, in response to the particulate level, the duct system 200 may utilize the active or passive configuration. The sensors 202-203 may include one or more sensors configured to measure particulates of air (e.g., as part of the intake flow 214, scavenge flow 216, or compressor flow 218). The sensor 202 may include any particulate sensor configured to measure particulate information such as the particulate level as described above or any particulate characteristics such as a size (e.g., fine particulates having a diameter at or greater than 2 micrometers but less than 100 micrometers or coarse particulates having a diameter at or greater than 100 micrometers), type (e.g., liquid or solid), or material (e.g., metallic, water, oil, etc.). The sensor 202 may be utilized without or in conjunction with optional sensor component 203, which may include any reflective surface. An exemplary sensor 202 may include a laser backscatter detection sensor, laser sensor, electro-optical sensor, infrared sensor, fiber optic sensor, optical position sensor, photodetector, photoelectric sensor, radar sensor, motion sensor, proximity sensor, magnetic sensor, ultrasonic sensor, electric conductivity sensor, or a combination thereof. In addition, the sensor 202 may include any sensor configured to measure airflow information such as an air flow rate sensor, temperature sensor, pressure sensor, moisture sensor, or altitude sensor. The sensor 202 may be alternatively located at the position of sensor component 203.

The splitter 208 includes the outer splitter surface 207 and the inner splitter surface 209. In the active configuration, the outer splitter surface 207 cooperates with the outer wall 204 to define the scavenge passage 211 therebetween and the inner splitter surface 209 cooperates with the inner wall 206 to define the compressor passage 212 therebetween. In the passive configuration, the outer wall 204 and inner wall 206 may move away from the splitter 208, while the splitter 208 remains relatively fixed, to decrease or close the scavenge passage 211 and increase the compressor passage 212. Alternatively, the splitter 208 may move while the outer wall 204 and inner wall 206 remain relatively fixed. It is contemplated that any combination of outer wall 204, inner wall 206, and splitter 208 may be configured to move or translate relative to any other portion of the system to selectively increase or decrease the scavenge passage 211 and the compressor passage 212. Thus, the duct system 200 may be selectively operable in the active and passive configurations.

To change between the active configuration and passive configuration, the outer wall 204 and inner wall 206 may be moved (e.g., translated) relative to the splitter 208 or vice versa, e.g., using the actuator 220. An exemplary actuator 220 may include a hydraulic (e.g., a cylinder or fluid motor that uses hydraulic power to facilitate mechanical operation), pneumatic (e.g., any device that converts energy formed by vacuum or compressed air into either linear or rotary motion), electric (e.g., a motor that converts electrical energy to mechanical force or torque), or mechanical actuator (e.g., a device that converts rotary motion into linear motion to execute movement such as gears, rails, pulleys, chains, and a rack and pinion). As shown in FIG. 2a, the splitter 208 is positioned between the outer wall 204 and inner wall 206 thereby splitting the intake flow 214 into the scavenge flow 216 and the compressor flow 218. Alternatively, as shown in FIG. 2b, the splitter 208 is positioned against the outer wall 204 thereby directing the intake flow 214 into compressor flow 218. Based on the position of the outer wall 204 and inner wall 206 relative to the splitter 208, the intake flow 214 may be selectively directed into or bypass the scavenge passage 211. Thus, the relative positioning of the outer wall 204, inner wall 206, and splitter 208 may be configured to selectively control airflow as part of the active configuration.

The flow control device 222 may include any device configured to selectively control or direct the airflow of the duct system 200, e.g., as part of the active configuration. The flow control device 222 may be configured to provide the injector flow 224 to selectively control the intake flow 214. The flow control device 222 may include any air jet injection or suction device configured to cause airflow to enter or leave the duct system 200. The flow control device 222 may include any flow control device having adaptable (active-passive) features and may be configured to provide suction or pressure with respect to the airflow of the duct system 200. For example, the flow control device 222 may include a suction device configured to provide suction with respect to the duct system 200. As a further example, the flow control device 222 may include a pressure device configured to provide pressure with respect to the duct system 200. The flow control device 222 may have opened, intermediate, and closed conditions for adjustable airflow control. In addition, the flow control device 222 may include a device configured physically modify any flow surface of duct system 200 by selectively providing a recessed surface portion, a smooth surface portion, or a protruded surface portion with respect to the flow surface. As a result, the flow control device 222 may be configured to selectively control airflow as part of the active configuration.

The electrostatic generators 226a-c may each include any electrostatic device configured to apply a positive or negative charge to matter or gather a plurality of smaller particulates into larger particulates or clusters, e.g., as part of the active configuration. For example, the electrostatic generator 226a may be positioned at any location with respect to the duct system 200 (e.g., an intake portion of the duct system 200) and may be configured to apply a positive or negative charge to particulate in the air of intake flow 214. The electrostatic generator 226b may be positioned at any location with respect to the duct system 200 (e.g., near the outer wall 204) and may be configured to apply an opposite charge (e.g., a positive charge for negatively charged particulate or a negative charge for positively charged particulate) thereby attracting the oppositely charged particulate in the intake flow 214 and moving the particulate preferentially toward the scavenge passage 211. The electrostatic generator 226c may be positioned at any location with respect to the duct system 200 (e.g., near the inner wall 206) and may be configured to apply like charge to the particulate (e.g., a positive charge for positively charged particulate or a negative charge for negatively charged particulate) thereby repelling the like charged particulate in the intake flow 214 and moving the particulate preferentially away from the compressor passage 218. Thus, the electrostatic generators 226a-c may be configured to selectively attract or repel particulate as part of the active configuration.

The system 100 may include a computer system in communication with the sensor 202. The computer system may include a processor and a memory communicatively connected to the processor. The processor may be configured to instruct the sensor 202 to measure a particulate level, receive the particulate level from the sensor 202, compare the particulate level to a particulate threshold (e.g., stored as part of the memory), and instruct the duct system 200 to utilize the active or passive configuration based on the comparison between the particulate level and particulate threshold. For example, if the particulate level reaches or is above the particulate threshold, the processor may instruct the actuator 220 to position the duct system 200 in the active configuration, e.g., positioning actuator 220 to allow scavenge flow 216, activating flow control device 222, and activating any combination of electrostatic generators 226a-c. As a further example, if the particulate level is below the particulate threshold, the processor may instruct the duct system 200 to utilize the passive configuration, e.g., positioning the actuator 220 to close the scavenge flow 216 and direct the intake flow 214 into the compressor flow 218. Accordingly, the duct system 200 may be selectively operable between the active and passive configurations based in part on the particulate level and the particulate threshold. It is also contemplated that a mechanical, pneumatic, or electric switch (e.g., a solenoid mechanism), without a processor, may be utilized to selectively switch the ducts system 200 between the active and passive configurations. Additionally, analog driven modulation may be utilized to provide selective intermediate activation of the adaptive components.

Figure 3:
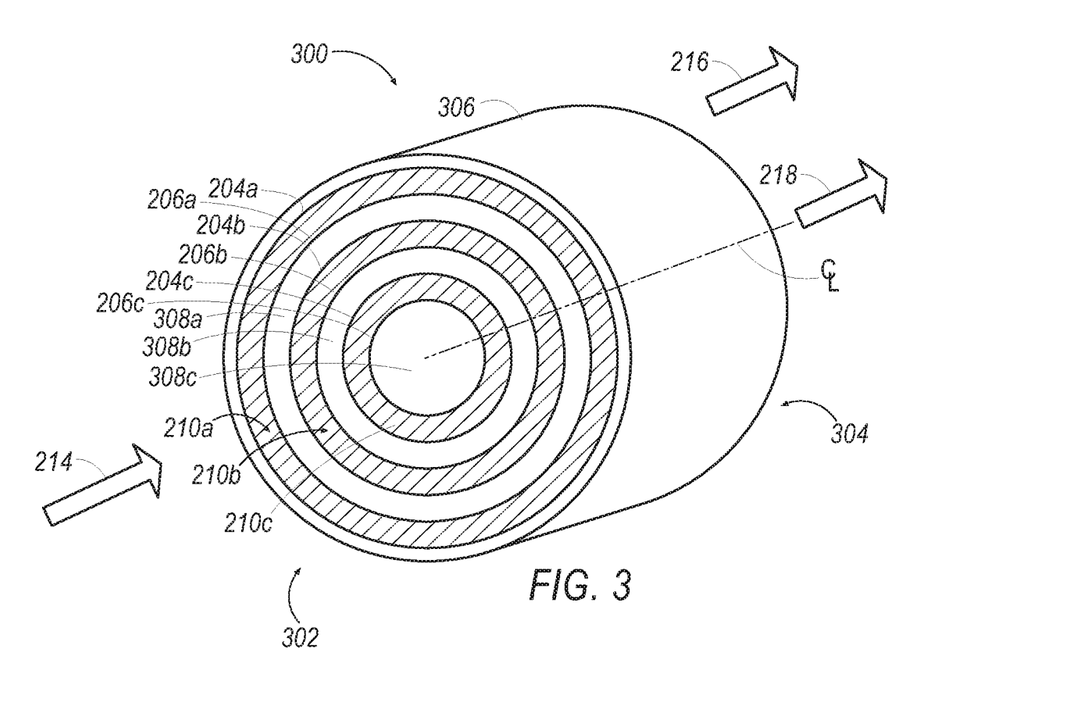
FIG. 3 illustrates a perspective view of a duct system, e.g., a three-flow system.
Figure 4A:
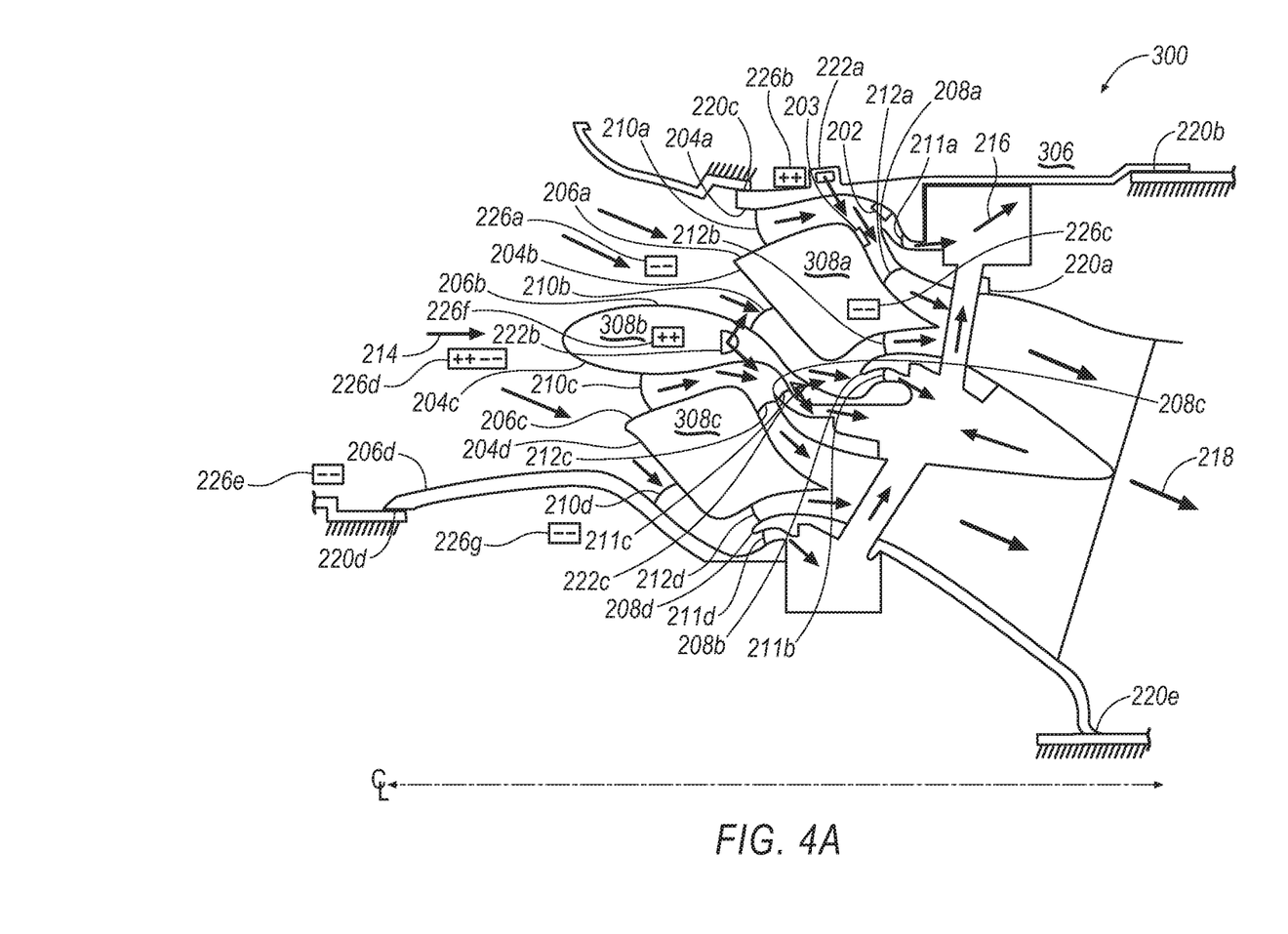
FIG. 4a illustrates a cross-sectional view of the duct system of FIG. 3, e.g., in an active or open configuration.
Figure 4B:
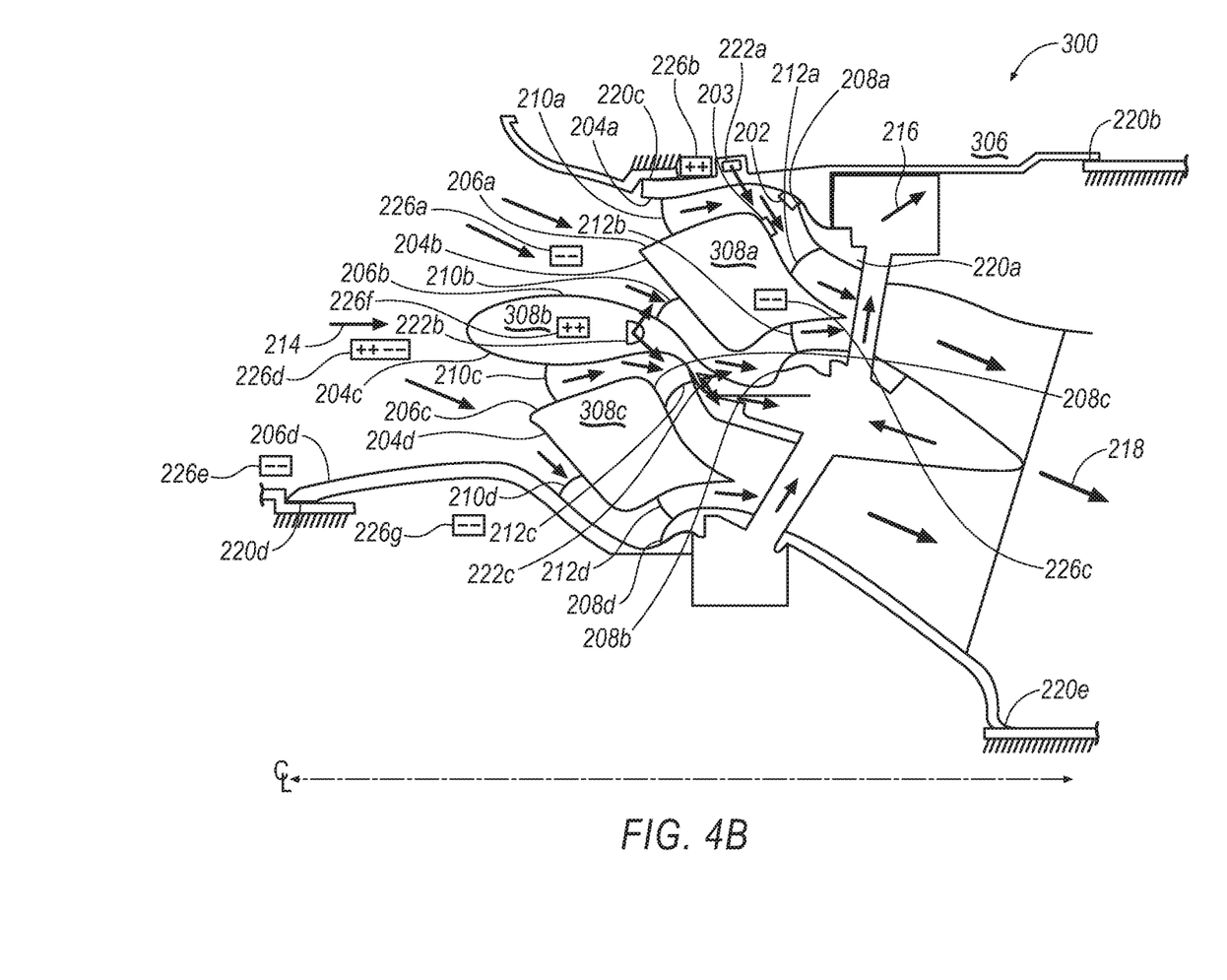
FIG. 4b illustrates a cross-sectional view of the duct system of FIG. 3, e.g., in a passive or closed configuration.

FIGS. 3-4a-b illustrate an exemplary duct system 300 of the particle separator 102. For example, the duct system 300 may include a plurality of duct systems similar to duct system 200 that are radially-spaced in a radial configuration (e.g., FIG. 3) or linearly-spaced in a linear configuration. The duct system 300 may include outer walls 204a-c, inner walls 206a-c, hubs 308a-c, splitters 208a-c, intake passages 210a-d, scavenge passage 211a-d, compressor passages 212a-d, intake flow 214, scavenge flow 216, compressor flow 218, actuators 220a-e, flow control devices 222a-c, a first end 302, a second end 304, and a shroud 306. Although system 300 is shown in FIG. 3 with the radial configuration, it is contemplated that any of the embodiments herein may utilized with a linear configuration or a segmented configuration.

The duct system 300 may be configured as a plurality of duct systems 200, e.g., any single or multi-flow system such as a three-flow system as illustrated in FIG. 3. The duct system 300 may receive the intake flow 214 into the intake passages 210a-d and may split into the scavenge flow 216 and compressor flow 218, as discussed above with respect the active configuration of duct system 200. The duct system 300 may also receive the intake flow 214, close the scavenge flow 216, and pass the intake flow 214 into the compressor flow 218, as discussed above with respect to the passive configuration of duct system 200.

As shown in FIGS. 4a-b, the hubs 308a-c and shroud 306 may be movable with respect to the splitters 208a-c to be selectively operable between the active configuration (e.g., FIG. 4a) and passive configuration (e.g., FIG. 4b), as discussed above with respect to the duct system 200. The hubs 308a-c and shroud 306 may be simultaneously or sequentially moveable with respect to the splitters 208a-c, e.g., using actuators 220a-e. In the active configuration of FIG. 4a, all or any combination of shroud 306, hub 308a, hub 208b, and hub 308c may be positioned toward respective splitters 208a-c thereby utilizing all or any combination of scavenge passages 211a-d. In the passive configuration of FIG. 4b, all or any combination of shroud 306, hub 308a, hub 208b, and hub 308c may be positioned toward respective splitters 208a-c thereby closing all or any combination of scavenge passages 211a-d and utilizing all or any combination of compressor passages 212a-d.

The flow control devices 222a-c may be configured to selectively modify the airflow as part of the intake passages 210a-d, e.g., as part of the active configuration as discussed above with respect to the duct system 200. For example, flow control device 222a may be configured to selectively modify the airflow with respect intake passage 210a and flow control devices 222b and 222c may be configured to selectively modify the airflow with respect to intake passages 210b and 210c. Flow control devices 222a-c may be configured to apply pressure or suction with respect to the intake flow 214 in the active configuration. In addition, the flow control devices 222a-c may include devices configured as discussed above with respect to the duct system 200.

The electrostatic generators 226a-g may be configured to apply a charge (e.g., positive and/or negative) to selectively modify the motion of the particulate in the airflow as part of the intake passages 210a-d, e.g., as part of the active configuration as discussed above with respect to the duct system 200. For example, electrostatic generator 226a may be configured to apply a charge (e.g., negative) to an outer portion of intake flow 214, electrostatic generator 226b may be configured to apply a charge (e.g., positive) to the shroud 306, electrostatic generator 226c may be configured to apply a charge (e.g., negative) to the hub 308a, electrostatic generator 226c may be configured to apply a charge (e.g., negative) to the hub 308a, electrostatic generator 226d may be configured to apply a charge (e.g., positive and negative) to a forefront portion of intake flow 214, electrostatic generator 226e may be configured to apply a charge (negative) to an inner portion of intake flow 214, electrostatic generator 226f may be configured to apply a charge (positive) to the hub 308b, and electrostatic generator 226g may be configured to apply a charge (e.g., negative) to the hub 308c. Alternatively, the any of electrostatic generators 226a-g may be configured to apply the opposite charge or a combination of charges. Thus, the electrostatic generators 226a-g may be configured to selectively modify the intake flow 214 as part of the active configuration. In addition, the system 200 may be configured to apply a randomly-selected, electrostatic charge to the particulate as it enters the separator and/or the particulate agglomerate as the pass therethrough, which may be configured as a switchable or adaptable feature.

The exemplary embodiments herein may be used in conjunction with any system of any vehicle including any engine system thereof. Merely as examples, embodiments of the present disclosure may include or be used in conjunction with any of the systems and methods disclosed in the crossed-referenced disclosures mentioned above, which have been incorporated herein.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A system for adaptive inertial particle separation and having an active configuration and a passive configuration, the system comprising:
    an air-intake duct configured to receive an intake flow, the air-intake duct including an outer wall spaced apart from a central axis, an inner wall located between the outer wall and the central axis, and an intake passage defined in part by the inner wall and the outer wall;
    a splitter located between the outer wall and the inner wall and including an outer splitter surface and an inner splitter surface, the inner splitter surface and the inner wall defining a compressor passage having a first area in the active configuration and a second area in the passive configuration, and the outer splitter surface and outer wall defining a scavenge passage in the active configuration;
    an electrostatic generator configured to apply a charge to the intake flow and urge the intake flow toward the scavenge passage; and
    an actuator configured to move the outer wall and the inner wall relative to the splitter.

2. The system of claim 1, wherein the intake flow includes particulates and the electrostatic generator is configured to apply at least one of a positive charge and a negative charge to the intake flow to cluster the particulates and urge the clustered particulates to the scavenge passage.

3. The system of claim 2, further comprising a sensor operatively connected to the air-intake duct, the sensor being configured to measure a particulate level of the particulates with respect to the intake passage and initiate at least one of the active configuration and passive configuration based on the particulate level reaching a particulate threshold.

4. The system of claim 1, wherein the intake flow includes an outer flow adjacent the outer wall and an inner flow adjacent the inner wall, and the electrostatic generator is positioned near at least one of the outer flow and the inner flow.

5. The system of claim 1, wherein the air-intake duct includes a hub with an outer hub surface and an inner hub surface configured to respectively split the intake flow between an outer flow and an inner flow, and the electrostatic generator is positioned near the hub.

6. The system of claim 1, wherein the actuator is configured to move the outer wall and inner wall relative to the splitter to selectively open the scavenge passage in the active configuration and close the scavenge passage in the passive configuration.

7. A system of gas turbine engine having an active configuration and a passive configuration, comprising:
    a combustor;
    a compressor coupled to the combustor;
    an air-intake duct configured to receive an intake flow and coupled to the compressor, the air-intake duct including an outer wall spaced apart from a central axis, an inner wall located between the outer wall and the central axis, and an intake passage defined in part by the inner wall and the outer wall;
    a splitter located between the outer wall and the inner wall and including an outer splitter surface and an inner splitter surface, the inner splitter surface and the inner wall defining a compressor passage having a first area in the active configuration and a second area in the passive configuration, and the outer splitter surface and outer wall defining a scavenge passage in the active configuration;
    an electrostatic generator configured to apply a charge to the intake flow and urge the intake flow toward the scavenge passage; and
    an actuator configured to move the outer wall and the inner wall relative to the splitter.

8. The system of claim 7, wherein the intake flow includes particulates and the electrostatic generator is configured to apply at least one of a positive charge and a negative charge to the intake flow to cluster the particulates and urge the clustered particulates to the scavenge passage.

9. The system of claim 8, further comprising a sensor operatively connected to the air-intake duct, the sensor being configured to measure a particulate level of the particulates with respect to the intake passage and initiate at least one of the active configuration and passive configuration based on the particulate level reaching a particulate threshold.

10. The system of claim 7, wherein the intake flow includes an outer flow adjacent the outer wall and an inner flow adjacent the inner wall, and the electrostatic generator is positioned near at least one of the outer flow and the inner flow.

11. The system of claim 7, wherein the air-intake duct includes a hub with an outer hub surface and an inner hub surface configured to respectively split the intake flow between an outer flow and an inner flow, and the electrostatic generator is positioned near the hub.

12. The system of claim 7, wherein the actuator is configured to move the outer wall and inner wall relative to the splitter to selectively open the scavenge passage in the active configuration and close the scavenge passage in the passive configuration.

13. A method of adaptive inertial particle separation with an active configuration and a passive configuration, the method comprising:
   providing an air-intake duct including an outer wall, an inner wall, and an intake passage, a splitter configured to be positioned between the inner wall and the outer wall, and an electrostatic generator;
   applying, by the electrostatic generator, a charge to the intake flow;
   urging, by the electrostatic generator, the intake flow toward the scavenge passage; and
   moving, by an actuator, the outer wall and the inner wall relative to the splitter.

14. The method of claim 13, wherein the applying the charge includes applying at least one of a positive charge and a negative charge to the intake flow to cluster particulates of the intake flow and urge the clustered particulates to the scavenge passage.

15. The method of claim 13, further comprising measuring, by a sensor, a particulate level of the intake flow.

16. The method of claim 15, further comprising initiating at least one of the active configuration and passive configuration based on the particulate level reaching a particulate threshold.

17. The method of claim 13, wherein the moving the outer wall and inner wall relative to the splitter opens the scavenge passage in the active configuration and closes the scavenge passage in the passive configuration.

* * * * *